United States Patent
Shrivastava et al.

(10) Patent No.: US 9,253,761 B2
(45) Date of Patent: Feb. 2, 2016

(54) TRANSMISSION OF ADVANCED-MAP INFORMATION ELEMENTS IN MOBILE NETWORKS

(71) Applicant: Intel Corporation, Santa Clara, CA (US)

(72) Inventors: Shweta Shrivastava, Beaverton, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 132 days.

(21) Appl. No.: 14/031,295

(22) Filed: Sep. 19, 2013

(65) Prior Publication Data

US 2014/0016606 A1    Jan. 16, 2014

Related U.S. Application Data

(62) Division of application No. 12/615,629, filed on Nov. 10, 2009, now Pat. No. 8,560,696.

(51) Int. Cl.
*H04W 72/04* (2009.01)
*H04L 1/18* (2006.01)

(52) U.S. Cl.
CPC .............. *H04W 72/04* (2013.01); *H04L 1/1835* (2013.01); *H04L 1/1812* (2013.01)

(58) Field of Classification Search
CPC .................................................. H04W 72/04
See application file for complete search history.

(56) References Cited

U.S. PATENT DOCUMENTS

| | | | |
|---|---|---|---|
| 7,574,179 B2 | 8/2009 | Barak et al. | |
| 7,751,356 B2 | 7/2010 | Kim et al. | |
| 7,844,057 B2 | 11/2010 | Meier et al. | |
| 8,325,687 B2 | 12/2012 | Tinnakornsrisuphap et al. | |
| 8,743,797 B2 * | 6/2014 | Park et al. | 370/329 |
| 2002/0142780 A1 | 10/2002 | Airy et al. | |
| 2005/0136951 A1* | 6/2005 | Gibbons et al. | 455/464 |
| 2008/0090584 A1 | 4/2008 | Kim et al. | |
| 2009/0022178 A1 | 1/2009 | Ji et al. | |

(Continued)

FOREIGN PATENT DOCUMENTS

| | | | |
|---|---|---|---|
| KR | 10-2008-0052120 A | 6/2008 | |
| WO | 2007024098 A1 | 3/2007 | |

(Continued)

OTHER PUBLICATIONS

Notice of Allowance received for Korean Patent Application No. 2011-7028446, mailed on Dec. 20, 2013, 3 pages of Notice of Allowance Including 1 page of English Translation.

(Continued)

*Primary Examiner* — John Blanton
(74) *Attorney, Agent, or Firm* — Alpine Technology Law Group LLC

(57) ABSTRACT

An apparatus that transmits Advanced-MAP (A-MAP) information in a mobile communication network determines whether or not to split an information element to two or more parts that will be transmitted in two or more logical resource units. Each part of information element in a logical resource unit includes an indicator to indicate that a second part exists in another subsequent logical resource unit. In one embodiment, the mobile communication network is used in conjunction with orthogonal frequency division multiple access (OFDMA) techniques.

28 Claims, 6 Drawing Sheets

(56) References Cited

U.S. PATENT DOCUMENTS

| | | | |
|---|---|---|---|
| 2009/0175259 A1* | 7/2009 | Lucky | 370/349 |
| 2009/0285168 A1 | 11/2009 | Choi et al. | |
| 2010/0040015 A1 | 2/2010 | Ernstrom et al. | |
| 2010/0113047 A1* | 5/2010 | Kim et al. | 455/450 |
| 2010/0124197 A1* | 5/2010 | Pi | 370/329 |
| 2010/0173651 A1 | 7/2010 | Park et al. | |
| 2010/0215030 A1 | 8/2010 | Agrawal et al. | |
| 2011/0249644 A1 | 10/2011 | Boariu et al. | |

FOREIGN PATENT DOCUMENTS

| | | | |
|---|---|---|---|
| WO | 2010/129209 A2 | 11/2010 | |
| WO | 2010/129209 A3 | 2/2011 | |

OTHER PUBLICATIONS

Office Action received for Taiwan Patent Application No. 099113310, mailed on Apr. 18, 2014, 11 Pages of Office Action including 5 pages of English Translation.

Hamiti, Shkumbin, "The draft IEEE 802.16m System Description Document", IEEE 802.16 Broadband Wireless Access Working Group, IEEE 802.16m-08/003r5, Oct. 3, 2008, 122 pages.

Office Action Received for Korean Patent Application No. 2011-7028446, mailed on Apr. 19, 2013, 4 pages of English Translation only.

Hsuan, et al., "Proposed text on assignment A-MAP segmentation in the 802.1 6m AWD (16.3.6)", IEEE C802.16m-09/2575r4, IEEE 802.16 Broadband Wireless Access Working Group, Mar. 16, 2010, 4 Pages.

Yuk, et al., "Proposed text on A-MAP IE segmentation in the 802.16m (16.3.6)", IEEE 802.16 Broadband Wireless Access Working Group, Mar. 15, 2010, 4 Pages.

International Preliminary Report on Patentability Received for PCT Patent Application No. PCT/US2010/032348, mailed on Nov. 10, 2011, 8 pages.

International Search Report and Written Opinion Received for International Application No. PCT/US2010/032348, mailed on Dec. 9, 2010, 13 Pages.

Notice of Allowance received for Taiwan Patent Application No. 099113310, mailed on Jul. 30, 2014, 2 pages of TW NOA only.

Office Action received for Chinese Patent Application No. 201080028979.3, mailed on Jul. 3, 2014, 15 pages of English Translation and 8 pages of CN Office Action.

Roshni Srinivasan, et al., "Proposed Text for the Draft P802.16m Amendment on the PHY Structure for DLC", IEEE 802.16 Broadband Wireless Access Working Group, Jan. 12, 2009, 15 pages.

Office Action received for Chinese Patent Aplication 201080028979.3, issued on Mar. 11, 2015, 16 pages including 10 pges of English translation.

Office Action and Search Report received for Taiwanese Patent Application No. 103129874, mailed on Sep. 18, 2015, 6 pages including 3 pages of English translation.

Office Action received for Chinese Patent Application No. 201080028979.3, mailed on Sep. 22, 2015, 20 pages including 14 pages of English translation.

* cited by examiner

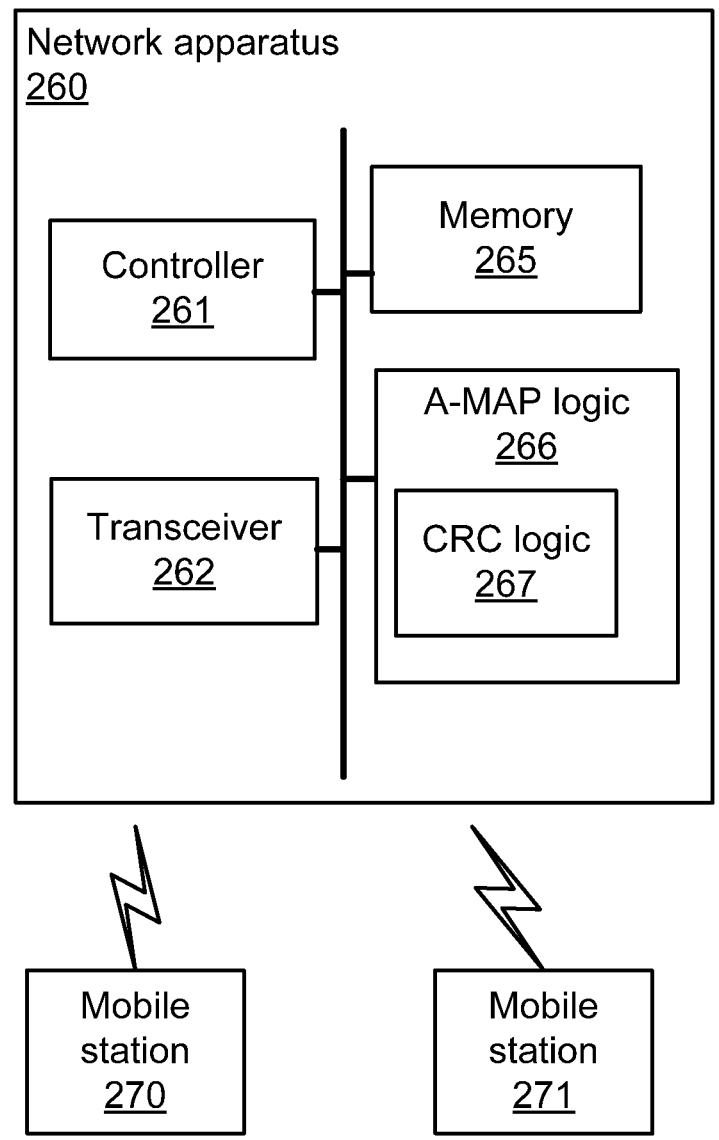

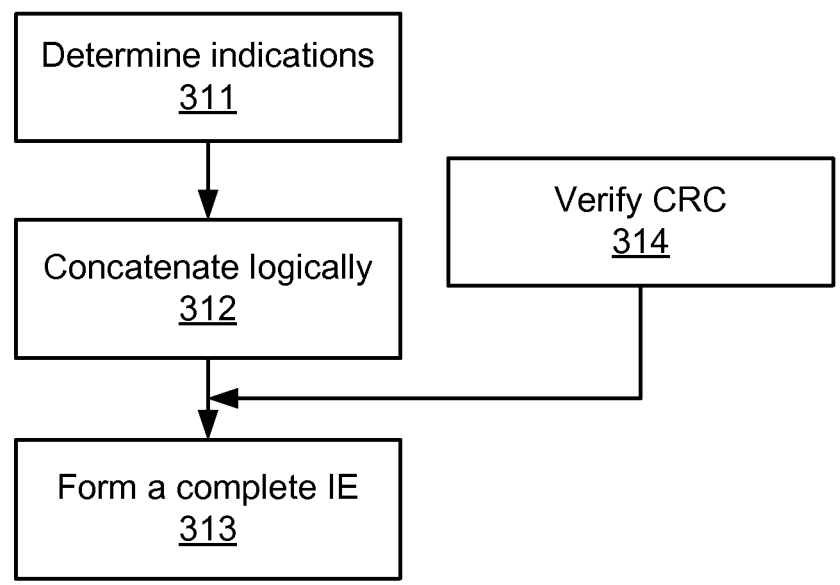

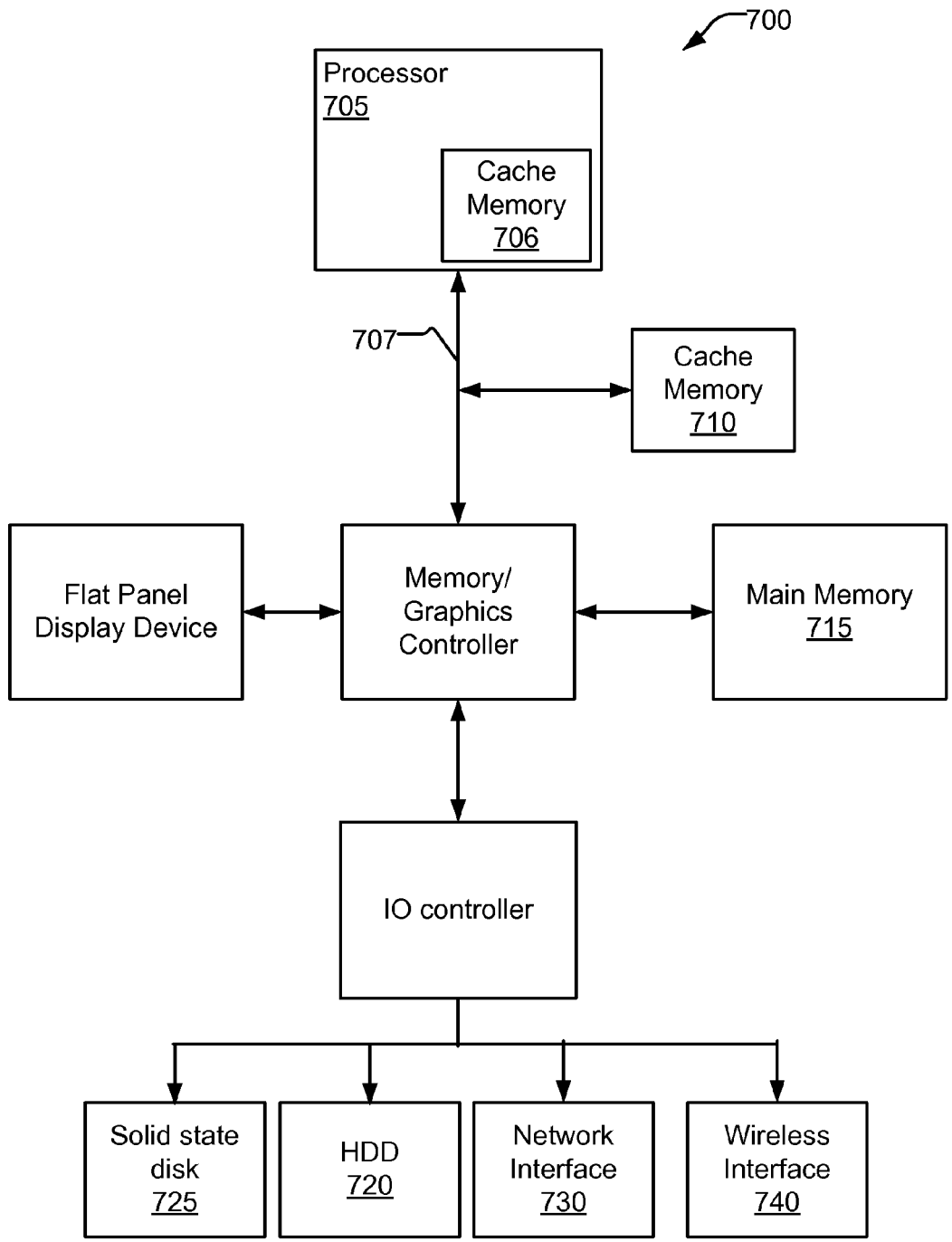

TRANSMISSION OF ADVANCED-MAP INFORMATION ELEMENTS IN MOBILE NETWORKS

CROSS-REFERENCE TO RELATED APPLICATIONS

This application is a divisional patent application of U.S. patent application Ser. No. 12/615,629, filed Nov. 10, 2009, which in turn claims the benefit of U.S. Provisional Application No. 61/173,204, filed on Apr. 28, 2009, entitled "Advanced Wireless Communication Systems And Techniques," the contents of which incorporated herein by reference as if set forth herein in full.

FIELD OF THE INVENTION

Embodiments of the invention relate to the field of mobile network communications.

BACKGROUND OF THE INVENTION

Mobile Worldwide Interoperability for Microwave Access (WiMAX) is a broadband wireless access technology based on Institute of Electrical and Electronics Engineers (IEEE) 802.16 standard. Mobile WiMAX uses a scalable orthogonal frequency division multiple access (OFDMA) scheme to deliver wireless broadband packet data services to mobile terminals.

IEEE 802.16m OFDMA air interface is a frame based network protocol. In general, each frame is time-divided into multiple sub-frames (e.g., 8 sub-frames). Some of these sub-frames contain downlink (DL) traffic and others carry uplink (UL) traffic. Some of the DL sub-frames also contains control information about allocations of resource units.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

FIG. 2 shows a block diagram of a network apparatus in accordance with one embodiment of the invention.

FIG. 3b is a flow diagram of one embodiment of a process to receive a complete information element (IE).

FIG. 5 illustrates a computer system for use with one embodiment of the present invention.

DETAILED DESCRIPTION OF THE INVENTION

Figure 1:
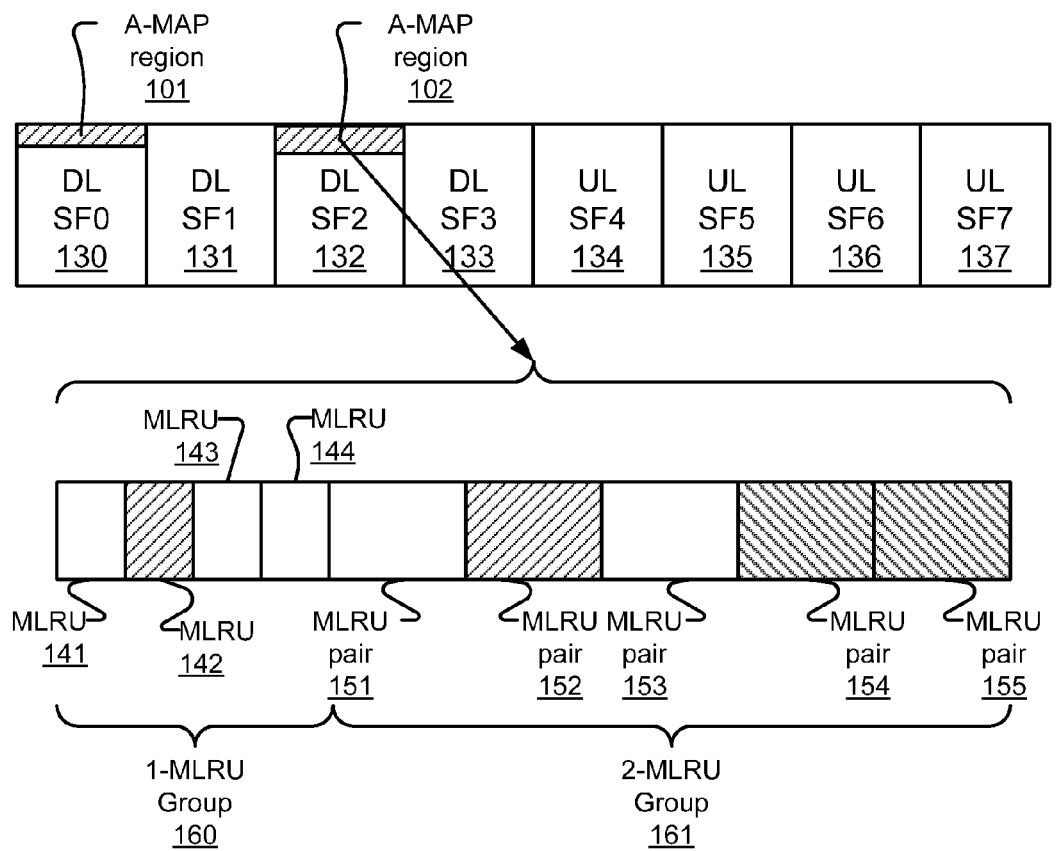
FIG. 1 shows two groups of minimum logical resource units (MLRUs) in accordance with an embodiment of the invention.

Embodiments of an apparatus that transmit Advanced-MAP (A-MAP) information elements (IEs) in a mobile communication network are presented. In one embodiment, the apparatus determines whether or not to split an information element to two or more parts that will be transmitted in two or more logical resource units. The first part of information element in a logical resource unit includes an indicator to indicate that a second part exists in another subsequent logical resource unit. In one embodiment, the mobile communication network is used in conjunction with orthogonal frequency division multiple access (OFDMA) techniques.

The method and apparatus described herein are for transmission of Advanced-MAP (A-MAP) information elements (IEs). Specifically, the transmission of A-MAP IEs in a mobile wireless network is primarily discussed in reference to a WiMax network. However, the method and apparatus for transmission of system configuration information are not so limited, as they may be implemented on or in association with any integrated circuit device or system, such as cell phones, personal digital assistants, embedded controllers, mobile platforms, desktop platforms, and server platforms, as well as in conjunction with other resources.

The following inventive embodiments may be used in a variety of applications including transmitters and receivers of a radio system. Radio systems specifically included within the scope of the present invention include, but are not limited to, network interface cards (NICs), network adaptors, mobile stations, base stations, access points (APs), hybrid coordinators (HCs), gateways, bridges, hubs, routers, relay stations, repeaters, analog repeaters, and amplify and forward repeaters. Further, the radio systems within the scope of the invention may include cellular radio telephone systems, satellite systems, personal communication systems (PCS), two-way radio systems, and two-way pagers as well as computing devices including radio systems such as personal computers (PCs) and related peripherals, personal digital assistants (PDAs), personal computing accessories, and all existing and future arising systems which may be related in nature and to which the principles of the inventive embodiments could be suitably applied.

While the following detailed description may describe example embodiments of the present invention in relation to wireless metropolitan area networks (WMANs) or other wireless wide area networks (WWANs), the embodiments are not limited thereto and can be applied to other types of wireless networks where similar advantages may be obtained. Such networks for which inventive embodiments may be applicable specifically include, wireless personal area networks (WPANs), wireless local area networks (WLANs), WWANs such as cellular networks, or combinations of any of these networks. Further, inventive embodiments may be discussed in reference to wireless networks utilizing Orthogonal Frequency Division Multiplexing (OFDM) modulation. However, the embodiments of present invention are not limited thereto and, for example, the embodiments can be implemented using other modulation or coding schemes where suitably applicable.

Overview

FIG. 1 shows two groups of minimum A-MAP logical resource units (MLRUs) in accordance with an embodiment of the invention. Referring to FIG. 1, in one embodiment, a frame includes eight sub-frames (i.e., sub-frames 130-137). In one embodiment, sub-frames 130-133 contain contents for downlink traffic, whereas sub-frames 134-137 contain uplink traffic. In one embodiment, some downlink sub-frames (e.g., sub-frame 130 and sub-frame 132) contain an advanced-MAP (A-MAP) region (e.g., A-MAP regions 101-102).

In one embodiment, the basic unit of allocation for an A-MAP region is known as minimum logical resource unit (MLRU). In one embodiment, a part of an A-MAP region (e.g., A-MAP 102) includes two groups of MLRUs (i.e., MLRU group 160 and MLRU group 161). In one embodiment, MLRU group 160 includes MLRUs 141-144 in a serial order. In one embodiment, MLRU group 161 includes MLRU pairs 151-155.

In one embodiment, the size of each MLRU pair is two times the size of a single MLRU (e.g., MLRU 141). In one embodiment, an MLRU pair is a concatenation of two consecutive single MLRUs. In one embodiment, an MLRU pair is referred to as a double MLRU (MLRU). In one embodiment, an MLRU and an MLRU pair are also referred to as a logical resource unit (LRU).

In one embodiment, a downlink sub-frame contains data for users and control information which tells which resources in the frame are allocated for (assigned to) which users. A base station (BS) transmits such control information to mobile stations (MS). In one embodiment, such control information is sent in the form of messages which are referred to as A-MAP information elements (IEs).

In one embodiment, an A-MAP region carries unicast service control information. Unicast service control information includes user-specific control information and non-user-specific control information. User-specific control information is further divided into assignment information, HARQ feedback information, and power control information. The control information is transmitted in the assignment A-MAP, HARQ feedback A-MAP, and power control A-MAP, respectively. In one embodiment, the A-MAPs share a region of physical resources called A-MAP region (e.g., A-MAP regions 101-102).

In one embodiment, assignment A-MAP contains resource assignment information which is categorized into multiple types of resource assignment IEs (assignment A-MAP IE). Each assignment A-MAP IE is coded separately and carries information for one or a group of users.

In one embodiment, a minimum logical resource unit (MLRU) is sometimes referred to as a MAP logical resource unit. In one embodiment, an MLRU includes 56 data tones. In one embodiment, for decoding purposes, the size of a single MLRU is fixed while most IEs are designed to fit within one MLRU. However, some IEs (e.g., a group resource allocation IE and a Persistent Allocation IE) are varied in sizes. Some IEs span multiple MLRUs.

In one embodiment, a group resource allocation (GRA) IE is an information element specifically for use of group resource allocation (GRA). In one embodiment, a GRA IE occupies different number of MLRUs depending upon its length. If the GRA IE is sent over multiple MLRUs, then the IE has to be broken into multiple segments (parts), such that each segment fits into one MLRU (e.g., single MLRU and double MLRU).

Concatenating 3 or 4 Units of MLRUs

In one embodiment, for example, a GRA IE requires 3 units of MLRUs. The GRA IE is split to two non-contiguous parts including a first part in MLRU 142 and a second part in MLRU 152 (indicated with a same pattern). MLRU pair 152 is a double width MLRU whose size is equivalent to the size of two consecutive single MLRUs.

In one embodiment, each MLRU contains a 1-bit field (concatenation indicator) to indicate that the MLRU is only a part of a complete IE. Concatenation of two parts will be required to retrieve a complete version of the IE when a mobile station receives the frame. In one embodiment, both MLRUs also contain a same identifier for the purpose of concatenation. It is appreciated by those of ordinary skill in the art that different data formats may be used in accordance with the embodiment to enable a mobile station to form a complete IE from multiple MLRUs.

In one embodiment, for example, a GRA IE requires four units of MLRUs. The GRA IE is split to two parts including a first part in MLRU pair 154 and a second part in MLRU pair 155. In this example, MLRU pair 154 and MLRU 155 are contiguous to each other. Each MLRU pair includes a concatenation indicator (e.g., set to '1'). In one embodiment, the indicator is only a 1-bit field if an IE fits in less than or equal to four logical resource units (as shown in both examples above).

In one embodiment, when a mobile station receives all the MLRUs transmitted in an A-MAP, the mobile station decodes only the MLRUs with CRCs masked with a station ID or group ID associated with the mobile station.

In one embodiment, when a mobile station receives an IE with a concatenation indicator set to '1', the mobile station interprets that the IE is divided to two segments. The mobile station waits to receive another segment with the same ID and with a concatenation indicator set to '1'. In one embodiment, the mobile station logically concatenates the segments in the same order in which the segment were transmitted in the A-MAP. If one of the segments is lost, then the mobile station simply discards the other segment.

In one embodiment, each segment is associated with a separate CRC for integrity check. In one embodiment, the integrity of each segment is performed independently (rather than relying on other segments). The total processing time is reduced if compared to techniques in which CRC integrity check is performed only after all segments are received. In one embodiment, the CRC is masked with a station identifier and a group identifier for an individual allocation and a group allocation respectively.

Concatenating More than 4 Units of MLRUs

In one embodiment, the size of an IE is longer than 4 units of MLRUs. The IE is divided to more than two parts. In one embodiment, each segment (part) of IE includes a concatenation indicator (e.g., 1-bit field), a 4-bit field which indicates the next MLRU number, and a 1-bit field which indicates whether the segment is the first segment (first-segment indicator). In one embodiment, the 4-bit field of a segment is set to "0000" to indicate that the segment is the last segment. It is appreciated by those of ordinary skill in the art that different data formats may be used in accordance with the embodiment to enable a mobile station forming a complete IE from multiple MLRUs.

In one embodiment, when a mobile station receives such an IE, the mobile station determine that more than one segment is required to form a complete IE if the concatenation indicator is set to '1'. The mobile station determines whether the segment is the first segment (the beginning part) of the IE based on the 1-bit first-segment indicator.

In one embodiment, a mobile station also determines which is the next segment based on the 4-bit field which indicates the next MLRU number. The mobile station continues the process until the last segment is found (e.g., the 4-bit field is set to '0000'). In one embodiment, the mobile station concatenates all segments to compose a complete IE.

FIG. 2 shows a block diagram of a network apparatus in accordance with one embodiment of the invention. Many related components such as data buses and peripherals have not been shown to avoid obscuring the invention. Referring to FIG. 2, in one embodiment, network apparatus 260 comprises controller 261, transceiver 262, A-MAP logic 266, and memory 265. In one embodiment, network apparatus 260 communicates with mobile station 270 and mobile station 271. In one embodiment, A-MAP logic 266 further includes CRC logic 267.

In one embodiment, controller 261 controls operations of network apparatus 260. In one embodiment, controller 261 manages generation of network frames, scheduling of network frames, and monitoring system performance. In one embodiment, memory 265 stores programs to be executed by controller 261.

In one embodiment, transceiver 262 includes physical (PHY) layer circuitry for communicating with the physical mediums (wireless or otherwise), media access control (MAC) layer circuitry, and higher-level layer (HLL) circuitry. In one embodiment, PHY layer circuitry, MAC layer circuitry, and HLL circuitry comprise functionality for both receiver and transmitter operations and include processing circuitry to evaluate communications from network apparatus 260, among other things. In one embodiment, transceiver 262 is connected to a core network, such as an Internet protocol (IP) network, via a wireless connection, a physical wired connection (e.g., electrical or fiber optic connection), or both.

In one embodiment, A-MAP logic 266 determines how to transmit an A-MAP IE in one or more MLRUs. In one embodiment, A-MAP logic 266 determines the size of an A-MAP IE and splits the IE to multiple segments (parts) to be fit into two or more MLRUs. In one embodiment, the MLRUs used are of different groups and of different sizes (e.g., single MLRU and double MLRU). In one embodiment, the MLRUs used are non-contiguous MLRUs, MLRU pairs, or both.

In one embodiment, A-MAP logic 266 sets indicators in each part of an IE including, for example: a 1-bit concatenation indicator, a 4-bit next-segment value, a 1-bit first-segment indicator, or any combinations thereof. In one embodiment, A-MAP logic 266 decodes indicators set in each part of an IE including, for example: a 1-bit concatenation indicator, a 4-bit next-segment value, a 1-bit first-segment indicator, or any combinations thereof.

In one embodiment, CRC logic 267 computes CRC values for data integrity check. In one embodiment, CRC logic 267 performs CRC computation for a segment independently, without relying on other segment(s). In one embodiment, CRC logic 267 performs multiple CRC computations in parallel.

In one embodiment, network apparatus 260 comprises, for example, client devices and network points of attachments. In one embodiment, network apparatus 260 is fixed, stationary, or mobile depending on the particular environment or implementation and communicates over the medium of free space generally referred to as the "air interface" (e.g., wireless shared media).

In one embodiment, network apparatus 260 comprises wireless devices that comply with or operate in accordance with one or more protocols, such as, for example, WiFi, Bluetooth, UWB, WiMAX, and cellular protocols. Network apparatus 260 comprises, but is not necessarily limited to, a computer, server, workstation, laptop, ultra-laptop, handheld computer, telephone, cellular telephone, personal digital assistant (PDA), router, switch, bridge, hub, gateway, wireless device, multi-network, multiple integrated radio devices, mixed-network device supporting multiple concurrent radios, WiFi plus cellular telephone, portable digital music player, pager, two-way pager, mobile subscriber station, printer, camera, enhanced video and voice device, and any other one-way or two-way device capable of communicating with other devices or base stations. The embodiments are not limited in this context.

Figure 3A:
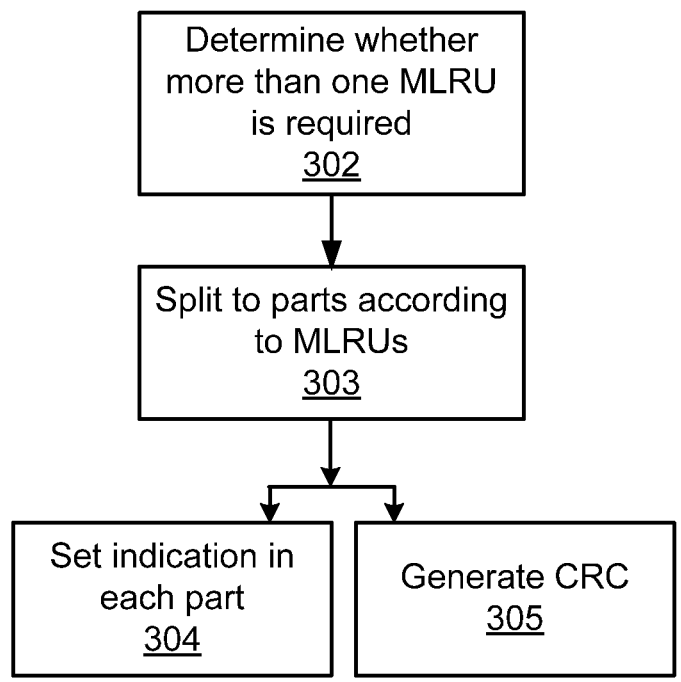
FIG. 3a is a flow diagram of one embodiment of a process for transmission of an A-MAP information element (IE).

FIG. 3a is a flow diagram of one embodiment of a process for transmission of an A-MAP information element (IE). The process is performed by processing logic that may comprise hardware (circuitry, dedicated logic, etc.), software (such as one that is run on a general purpose computer system or a dedicated machine), or a combination of both. In one embodiment, the process is performed in conjunction with a network apparatus (e.g., network apparatus with respect to FIG. 2). In one embodiment, the process is performed by a computer system such as the computer system shown in FIG. 5.

Referring to FIG. 3a, in one embodiment, processing logic begins by determining whether or not more than one MLRU is required based at least on the size of an A-MAP IE (process block 302).

In one embodiment, processing logic splits the IE to two segments to transmit the segments in different MLRUs (process block 303). In one embodiment, the MLRUs used are of different groups and of different sizes (e.g., single MLRU and double MLRU). In one embodiment, the MLRUs used are non-contiguous.

In one embodiment, processing logic sets indication data in each segment of the IE (process block 304). In one embodiment, the indication data includes: a 1-bit concatenation indicator, a 4-bit next-segment value, a 1-bit first-segment indicator, or any combinations thereof. In one embodiment, the indication data includes only a 1-bit concatenation indicator if the IE fits in less than or equal to four logical resource units (i.e., two segments).

In one embodiment, processing logic computes a CRC (process block 305) for each segment of the IE. In one embodiment, processing logic performs a CRC computation for a segment independently, without relying to other segment(s). In one embodiment, processing logic performs multiple CRC computations in parallel.

FIG. 3b is a flow diagram of one embodiment of a process to form a complete information element (IE). The process is performed by processing logic that may comprise hardware (circuitry, dedicated logic, etc.), software (such as one that is run on a general purpose computer system or a dedicated machine), or a combination of both. In one embodiment, the process is performed in conjunction with a network apparatus (e.g., network apparatus with respect to FIG. 2). In one embodiment, the process is performed by a computer system such as the computer system shown in FIG. 5.

Referring to FIG. 3b, in one embodiment, processing logic begins by determining indication data set in multiple segments of an IE (process block 311).

In one embodiment, processing logic decodes indicators set in each part of an IE including: a 1-bit concatenation indicator, a 4-bit next-segment value, a 1-bit first-segment indicator, or any combinations thereof.

In one embodiment, the indication data includes only a 1-bit concatenation indicator if the IE fits in less than or equal to four logical resource units. When processing logic receives an IE with a concatenation indicator set to '1', processing logic interprets that the IE is divided to two segments. Processing logic waits to receive another segment with the same ID and with the concatenation indicator set to '1'.

In one embodiment, processing logic verifies the CRC value (process block 314) for each segment of the IE. In one embodiment, processing logic performs CRC computation for a segment independently, without relying to other segment(s). In one embodiment, processing logic performs multiple CRC computations in parallel.

In one embodiment, processing logic concatenates segments of an IE logically in the same order in which they were transmitted in the A-MAP (process block 312). If one of the segments is lost, processing logic discards the other segment(s).

In one embodiment, processing logic forms a complete IE from multiple segments based on indication data set in the segments (process block 313).

Figure 4:
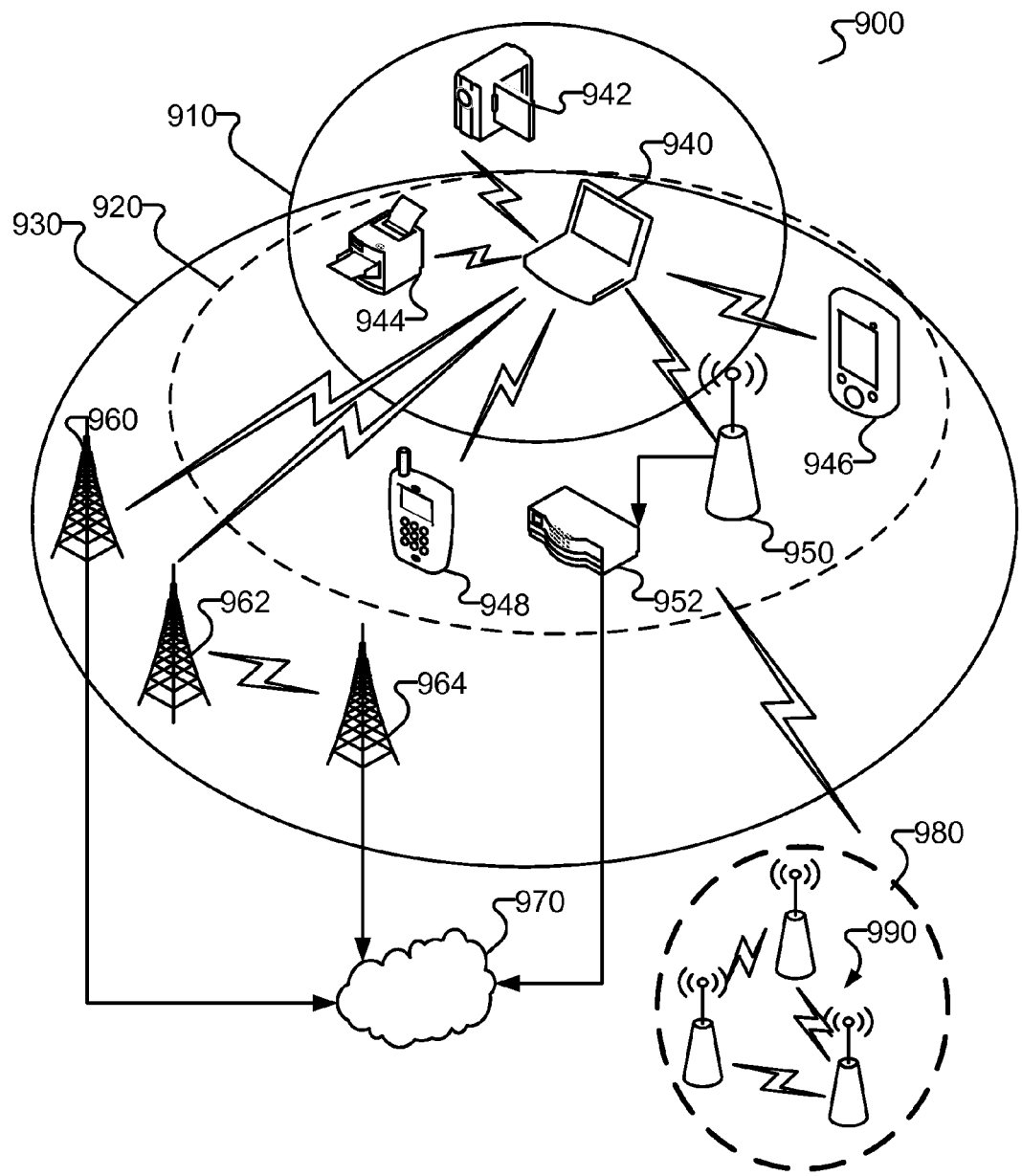
FIG. 4 is a diagram representation of a wireless communication system in accordance with one embodiment of the invention.

FIG. 4 is a diagram representation of a wireless communication system in accordance with one embodiment of the invention. Referring to FIG. 4, in one embodiment, wireless communication system 900 includes one or more wireless communication networks, generally shown as 910, 920, and 930.

In one embodiment, the wireless communication system 900 includes a wireless personal area network (WPAN) 910, a wireless local area network (WLAN) 920, and a wireless metropolitan area network (WMAN) 930. In other embodiments, wireless communication system 900 includes additional or fewer wireless communication networks. For example, wireless communication network 900 includes additional WPANs, WLANs, and/or WMANs. The methods and apparatus described herein are not limited in this regard.

In one embodiment, wireless communication system 900 includes one or more subscriber stations (e.g., shown as 940, 942, 944, 946, and 948). For example, the subscriber stations 940, 942, 944, 946, and 948 include wireless electronic devices such as, for example, a desktop computer, a laptop computer, a handheld computer, a tablet computer, a cellular telephone, a pager, an audio/video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and other suitable fixed, portable, or mobile electronic devices. In one embodiment, wireless communication system 900 includes more or fewer subscriber stations.

In one embodiment, subscriber stations 940, 942, 944, 946, and 948 use a variety of modulation techniques such as spread spectrum modulation (e.g., direct sequence code division multiple access (DS-CDMA), frequency hopping code division multiple access (FH-CDMA), or both), time-division multiplexing (TDM) modulation, frequency-division multiplexing (FDM) modulation, orthogonal frequency-division multiplexing (OFDM) modulation, multi-carrier modulation (MCM), other suitable modulation techniques, or combinations thereof to communicate via wireless links.

In one embodiment, laptop computer 940 operates in accordance with suitable wireless communication protocols that require very low power, such as, for example, Bluetooth®, ultra-wide band (UWB), radio frequency identification (RFID), or combinations thereof to implement the WPAN 910. In one embodiment, laptop computer 940 communicates with devices associated with the WPAN 910, such as, for example, video camera 942, printer 944, or both via wireless links.

In one embodiment, laptop computer 940 uses direct sequence spread spectrum (DSSS) modulation, frequency hopping spread spectrum (FHSS) modulation, or both to implement the WLAN 920 (e.g., a basic service set (BSS) network in accordance with the 802.11 family of standards developed by the Institute of Electrical and Electronic Engineers (IEEE) or variations and evolutions of these standards). For example, laptop computer 940 communicates with devices associated with the WLAN 920 such as printer 944, handheld computer 946, smart phone 948, or combinations thereof via wireless links.

In one embodiment, laptop computer 940 also communicates with access point (AP) 950 via a wireless link. AP 950 is operatively coupled to router 952 as described in further detail below. Alternatively, AP 950 and router 952 may be integrated into a single device (e.g., a wireless router).

In one embodiment, laptop computer 940 uses OFDM modulation to transmit large amounts of digital data by splitting a radio frequency signal into multiple small sub-signals, which in turn, are transmitted simultaneously at different frequencies. In one embodiment, laptop computer 940 uses OFDM modulation to implement WMAN 930. For example, laptop computer 940 operates in accordance with the 802.16 family of standards developed by IEEE to provide for fixed, portable, mobile broadband wireless access (BWA) networks (e.g., the IEEE std. 802.16, published 2004), or combinations thereof to communicate with base stations, shown as 960, 962, and 964, via wireless link(s).

Although some of the above examples are described above with respect to standards developed by IEEE, the methods and apparatus disclosed herein are readily applicable to many specifications, standards developed by other special interest groups, standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.), or combinations thereof. The methods and apparatus described herein are not limited in this regard.

WLAN 920 and WMAN 930 are operatively coupled to network 970 (public or private), such as, for example, the Internet, a telephone network (e.g., public switched telephone network (PSTN)), a local area network (LAN), a cable network, and another wireless network via connection to an Ethernet, a digital subscriber line (DSL), a telephone line, a coaxial cable, any wireless connection, etc., or combinations thereof.

In one embodiment, WLAN 920 is operatively coupled to network 970 via AP 950 and router 952. In another embodiment, WMAN 930 is operatively coupled to network 970 via base station(s) 960, 962, 964, or combinations thereof. Network 970 includes one or more network servers (not shown).

In one embodiment, wireless communication system 900 includes other suitable wireless communication networks, such as, for example, wireless mesh networks, shown as 980. In one embodiment, AP 950, base stations 960, 962, and 964 are associated with one or more wireless mesh networks. In one embodiment, AP 950 communicates with or operates as one of mesh points (MPs) 990 of wireless mesh network 980. In one embodiment, AP 950 receives and transmits data in connection with one or more of MPs 990. In one embodiment, MPs 990 include access points, redistribution points, end points, other suitable connection points, or combinations thereof for traffic flows via mesh paths. MPs 990 use any modulation techniques, wireless communication protocols, wired interfaces, or combinations thereof described above to communicate.

In one embodiment, wireless communication system 900 includes a wireless wide area network (WWAN) such as a cellular radio network (not shown). Laptop computer 940 operates in accordance with other wireless communication protocols to support a WWAN. In one embodiment, these wireless communication protocols are based on analog, digital, or dual-mode communication system technologies, such as, for example, Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, High-Speed Downlink Packet Access (HSDPA) technology, High-Speed Uplink Packet Access (HSUPA) technology, other suitable generation of wireless access technologies (e.g., 3G, 4G, etc.) standards based on these technologies, variations and evolutions of these standards, and other suitable wireless communication standards. Although FIG. 4 depicts a WPAN, a WLAN, and a WMAN, in one embodiment, wireless communication system 900 includes other combinations of WPANs, WLANs, WMANs, and WWANs. The methods and apparatus described herein are not limited in this regard.

In one embodiment, wireless communication system 900 includes other WPAN, WLAN, WMAN, or WWAN devices (not shown) such as, for example, network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, other suitable communication system, or combinations thereof.

In one embodiment, subscriber stations (e.g., 940, 942, 944, 946, and 948) AP 950, or base stations (e.g., 960, 962, and 964) includes a serial interface, a parallel interface, a small computer system interface (SCSI), an Ethernet interface, a universal serial bus (USB) interface, a high performance serial bus interface (e.g., IEEE 1394 interface), any other suitable type of wired interface, or combinations thereof to communicate via wired links. Although certain examples have been described above, the scope of coverage of this disclosure is not limited thereto.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

FIG. 5 illustrates an example of a computer system in conjunction with one embodiment of the invention. Processor 705 accesses data from level 1 (L1) cache memory 706, level 2 (L2) cache memory 710, and main memory 715. In one embodiment, cache memory 710 is a shared cache for more than one processor core.

In one embodiment, memory/graphic controller 716, IO controller 717, or combinations thereof is integrated in processor 705. In one embodiment, parts of memory/graphic controller 716, parts of IO controller 717, or combinations thereof is integrated in processor 705.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 5. Furthermore, in other embodiments of the invention may be distributed throughout several circuits, logic units, or devices illustrated in FIG. 5.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

In the above description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method for transmitting information elements in a wireless communication network comprising:
    determining, by a network device, a size of an information element to be transmitted in two or more logical resource units; and
    splitting the information element to two or more parts if the size of the information element is larger than a logical resource unit's capacity, wherein each part corresponds to a logical resource unit, wherein at least a first part of the two or more parts includes indication data to indicate that a second part exists;
    wherein the logical resource units are non-contiguous and are of different logical resource unit groups.

2. The method of claim 1, wherein the indication data is a 1-bit field if the information element fits in less than or equal to four minimum logical resource units.

3. The method of claim 1, wherein the one or more parts contain a same identifier.

4. The method of claim 1, wherein the indication data further includes a 4-bit field to store a value indicating a next logical unit, if the information element fits in more than four minimum logical resource units.

5. The method of claim 1, wherein the indication data contains information about a subsequent logical resource unit which contains a second part of the information unit.

6. The method of claim 1, further comprising computing a CRC associated with each of the parts based at least on a station identifier or a group identifier.

7. A method for transmitting information elements in a wireless communication network, the method comprising:
    determining by a network device a size of an information element to be transmitted in two or more logical resource units in a downlink signal, the information element comprising control information for at least one mobile station that indicates which resources are allocated to the at least one mobile station, the information element being mapped onto at least one frequency block and at least one time slot of each of the two or more logical resource units (LRUs);
    dividing the information element to two or more parts if the size of the information element is larger than a capacity of a logical resource unit, each part corresponding to a LRU, and at least a first part of the two or more parts including indication data that the information element comprises two or more LRUs; and
    transmitting the divided information element in the downlink signal to the at least one mobile station;
    wherein the logical resource units are non-contiguous and are of different logical resource unit groups.

8. The method of claim 7, wherein the indication further indicates whether or not to perform concatenation of the two or more LRUs to receive a complete version of the information element.

9. The method of claim 7, wherein the control information comprises assignment information, Hybrid Automatic Repeat Request (HARQ) feedback information, or power control information.

10. The method of claim 7, wherein the indication data is a 1-bit field if the information element fits in less than or equal to four minimum logical resource units.

11. The method of claim 7, wherein the one or more parts contain a same identifier.

12. The method of claim 7, wherein the indication data further includes a 4-bit field to store a value indicating a next logical unit if the information element fits in more than four minimum logical resource units.

13. The method of claim 7, wherein the indication data contains information about a subsequent logical resource unit that contains a second part of the information unit.

14. The method of claim 7, further comprising computing a CRC associated with each of the parts based at least on a station identifier or a group identifier.

15. A network device comprising processing circuitry to:
    determine, by a network device, a size of an information element to be transmitted in two or more logical resource units; and
    split the information element to two or more parts if the size of the information element is larger than a logical resource unit's capacity, wherein each part corresponds to a logical resource unit, wherein at least a first part of the two or more parts includes indication data to indicate that a second part exists;
    wherein the logical resource units are non-contiguous and are of different logical resource unit groups.

16. The network device of claim 15, wherein the indication data is a 1-bit field if the information element fits in less than or equal to four minimum logical resource units.

17. The network device of claim 15, wherein the one or more parts contain a same identifier.

18. The network device of claim 15, wherein the indication data further includes a 4-bit field to store a value indicating a next logical unit, if the information element fits in more than four minimum logical resource units.

19. The network device of claim 15, wherein the indication data contains information about a subsequent logical resource unit which contains a second part of the information unit.

20. The network device of claim 15, further comprising computing a CRC associated with each of the parts based at least on a station identifier or a group identifier.

21. A network device comprising processing circuitry to:
    determine a size of an information element to be transmitted in two or more logical resource units in a downlink signal, the information element comprising control information for at least one mobile station that indicates which resources are allocated to the at least one mobile station, the information element being mapped onto at least one frequency block and at least one time slot of each of the two or more logical resource units (LRUs);

divide the information element to two or more parts if the size of the information element is larger than a capacity of a logical resource unit, each part corresponding to a LRU, and at least a first part of the two or more parts including indication data that the information element comprises two or more LRUs; and transmit the divided information element in the downlink signal to the at least one mobile station;

wherein the logical resource units are non-contiguous and are of different logical resource unit groups.

22. The network device of claim 21, wherein the indication further indicates whether or not to perform concatenation of the two or more LRUs to receive a complete version of the information element.

23. The network device of claim 21, wherein the control information comprises assignment information, Hybrid Automatic Repeat Request (HARQ) feedback information, or power control information.

24. The network device of claim 21, wherein the indication data is a 1-bit field if the information element fits in less than or equal to four minimum logical resource units.

25. The network device of claim 21, wherein the one or more parts contain a same identifier.

26. The network device of claim 21, wherein the indication data further includes a 4-bit field to store a value indicating a next logical unit if the information element fits in more than four minimum logical resource units.

27. The network device of claim 21, wherein the indication data contains information about a subsequent logical resource unit that contains a second part of the information unit.

28. The network device of claim 21, the processing circuitry further to compute a CRC associated with each of the parts based at least on a station identifier or a group identifier.

* * * * *